(12) United States Patent
Umlauf

(10) Patent No.: US 9,610,877 B2
(45) Date of Patent: Apr. 4, 2017

(54) COVER ADAPTABLE TO MULTIPLE VEHICLE SEAT CONFIGURATIONS

(71) Applicant: Seat Cover Pro, LLC, Richardson, TX (US)

(72) Inventor: James Umlauf, Phoenix, AZ (US)

(73) Assignee: Seat Cover Pro, LLC, Richardson, TX (US)

( * ) Notice: Subject to any disclaimer, the term of this patent is extended or adjusted under 35 U.S.C. 154(b) by 0 days.

(21) Appl. No.: 15/215,444

(22) Filed: Jul. 20, 2016

(65) Prior Publication Data
US 2016/0325660 A1 Nov. 10, 2016

Related U.S. Application Data

(63) Continuation of application No. 15/093,592, filed on Apr. 7, 2016.

(60) Provisional application No. 62/179,236, filed on May 1, 2015, provisional application No. 62/283,136, filed on Aug. 21, 2015, provisional application No. 62/283,114, filed on Aug. 21, 2015.

(51) Int. Cl.
*B60N 2/60* (2006.01)
*B60J 7/00* (2006.01)
*B60R 13/01* (2006.01)

(52) U.S. Cl.
CPC .......... *B60N 2/6009* (2013.01); *B60J 7/0007* (2013.01); *B60N 2/6018* (2013.01); *B60N 2/6036* (2013.01); *B60R 13/011* (2013.01); *B60R 2013/016* (2013.01)

(58) Field of Classification Search
CPC .. B60N 2/6009; B60N 2/6018; B60N 2/6036; B62J 7/0007; B60R 13/011
USPC ........................................................ 297/229
See application file for complete search history.

(56) References Cited

U.S. PATENT DOCUMENTS

| 4,134,616 A | * | 1/1979 | Christensen | ............. B60N 2/60 |
| | | | | 297/229 |
| 9,010,856 B2 | * | 4/2015 | Krankkala | ............... B60N 2/60 |
| | | | | 297/229 X |

FOREIGN PATENT DOCUMENTS

| SE | WO 9113576 A1 * | 9/1991 | ............... B60N 2/60 |

* cited by examiner

*Primary Examiner* — Anthony D Barfield
(74) *Attorney, Agent, or Firm* — David R. Conklin; Kirton McConkie

(57) ABSTRACT

A cover for a vehicle may include a lower portion sized and configured to extend over a horizontally-oriented top of a bench of a vehicle seat. The cover may also include an upper portion coupled to the lower portion. The upper portion may be sized and configured to extend upwardly over a backrest of the vehicle seat. The upper portion may include a first section, a second section, and a third section. Each of the first section, the second section, and the third section may extend from an upper edge of the upper portion to the lower portion. The cover may include a first coupling mechanism and a second coupling mechanism. The first coupling mechanism may be configured to couple the first section to the second section. The second coupling mechanism may be configured to couple the second section and the third section.

11 Claims, 15 Drawing Sheets

COVER ADAPTABLE TO MULTIPLE VEHICLE SEAT CONFIGURATIONS

RELATED APPLICATIONS

This application is a continuation of U.S. patent application Ser. No. 15/093,592, entitled SEAT COVER ADAPTABLE TO MULTIPLE SEAT VEHICLE CONFIGURATIONS, filed Apr. 7, 2016, which claims priority to U.S. Provisional Application Ser. No. 62/179,236, entitled SEAT COVER ADAPTABLE TO MULTIPLE SEAT VEHICLE CONFIGURATIONS, filed on May 1, 2015, United States Provisional Application Ser. No. 62/283,136, entitled SEAT COVER ADAPTABLE TO MULTIPLE SEAT VEHICLE CONFIGURATIONS, filed on Aug. 21, 2015, and United States Provisional Application Ser. No. 62/283,114, entitled SEAT COVER ADAPTABLE TO MULTIPLE SEAT VEHICLE CONFIGURATIONS, filed on Aug. 21, 2015, each of which are incorporated herein by reference.

BACKGROUND OF THE INVENTION

The present invention relates to a cover for an interior of a vehicle. In particular, the present invention relates to a cover adaptable to multiple vehicle seat configurations. In some embodiments, the cover for the vehicle may be used as seat cover and/or a cargo bed cover. Vehicle seats may be designed to move between various configurations, such as, for example, one section up and another section folded down, in order to allow items of various sizes to be transported in the vehicle. A cover for a vehicle seat and/or a cargo bed may be limited to a particular type of car, with particular dimensions and features, or a particular seat configuration. In some cases, the cover may not permit movement of the vehicle seat between the various configurations or may cover various features, such as seat belts. In order to perform a particular function in the vehicle, the cover may need to be removed. Further, vehicle seats may be exposed to various events that may damage the vehicle seats due to, for example, pets, children, spills, objects, etc.

BRIEF SUMMARY OF THE INVENTION

The present invention relates to a cover for an interior of a vehicle. In particular, the present invention relates to a cover adaptable to multiple vehicle seat configurations. In some embodiments, the cover for the vehicle may include a seat cover or a cargo bed cover. In some embodiments, the cover may include a lower portion. In some embodiments, the lower portion may be sized and configured to extend over a horizontally-oriented top of a bench of a vehicle seat. In some embodiments, the lower portion may be sized and configured to extend over a horizontally-oriented cargo area of the vehicle.

In some embodiments, the cover may also include an upper portion coupled to the lower portion. In some embodiments, the upper portion may be sized and configured to extend upwardly over a backrest of the vehicle seat. In some embodiments, the upper portion may be sized and configured to extend upwardly over a rear surface of the backrest.

In some embodiments, the upper portion may include a first section, a second section, and a third section. In some embodiments, the first section, the second section, and the third section may extend from an upper edge of the upper portion to the lower portion. In some embodiments, the first and second sections may be separated by a first vertical slit. In some embodiments, the second and third sections may be separated by a second vertical slit.

In some embodiments, the cover may include a first coupling mechanism, which may be configured to directly couple the first section and the second section. In some embodiments, the first coupling mechanism may be configured to at least partially close the first vertical slit. In some embodiments, the cover may include a second coupling mechanism, which may be configured to directly couple the second section and the third section. In some embodiments, the second coupling mechanism may be configured to at least partially close the second vertical slit. Coupling mechanisms may be configured to facilitate coupling and uncoupling.

In some embodiments, the first section may be configured to be folded on top of the lower portion independently of the second and third sections in response to the first section being uncoupled from the second section via the first coupling mechanism. In some embodiments, when the cover is used as the seat cover, the first section may be configured to be folded on top of the lower portion independently of the second and third sections in response to the first section being uncoupled from the second section via the first coupling mechanism and/or a first portion of the backrest being moved to a folded position. In some embodiments, when the cover is used as the cargo seat cover, the first section may be configured to move to a generally horizontal position independently of the second and third sections in response to the first section being uncoupled from the second section via the first coupling mechanism and/or a third portion of the backrest being moved to a folded position.

In some embodiments, the second section may be configured to be folded on top of the lower portion independently of the first and third sections in response to the first section being uncoupled from the second section via the first coupling mechanism and the third section being uncoupled from the second section via the second coupling mechanism. In some embodiments, when the cover is used as the seat cover, the second section may be configured to be folded on top of the lower portion independently of the first and third sections in response to the first section being uncoupled from the second section via the first coupling mechanism and the third section being uncoupled from the second section via the second coupling mechanism, and further in response to a second portion of the back rest being moved to a folded position. In some embodiments, when the cover is used as the cargo bed cover, the second section may be configured to move to a generally horizontal position independently of the first and third sections in response the first section being uncoupled from the second section via the first coupling mechanism and the third section being uncoupled from the second section via the second coupling mechanism, and further in response to the second portion of the back rest being moved to the folded position.

In some embodiments, the third section may be configured to be folded on top of the lower portion independently of the first and second sections in response to the third section being uncoupled from the second section via the second coupling mechanism. In some embodiments, when the cover is used as the seat cover, the third section may be configured to be folded on top of the lower portion independently of the first and second sections in response to the third section being uncoupled from the second section via the second coupling mechanism and/or the third portion of the backrest being moved to a folded position. In some embodiments, when the cover is used as the cargo bed cover, the third section may be configured to move to a generally horizontal position independently of the first and second sections in response to the third section being uncoupled from the second section via the second coupling mechanism and/or the first portion of the back rest being moved to the folded position.

In some embodiments, an upper portion of the first section and/or an upper portion of the third section may each include an anchor. In some embodiments, the anchor may be configured to secure the cover to a headrest of the vehicle.

In some embodiments, the cover may include one or more openings disposed between the upper portion and the lower portion. In some embodiments, the one or more openings may include one or more of the following: a first opening, a second opening, a third opening, and a fourth opening. In some embodiments, one or more of the first opening, the second opening, the third opening, and the fourth opening may include a generally horizontal slit. In some embodiments, the first opening may extend along a portion of a lower edge of the first section to at least the second section. In some embodiments, the first opening may extend along the portion of the lower edge of the first section to the third section. In these embodiments, in response to the first section being uncoupled from the second section via the first coupling mechanism and the third section being uncoupled from the second section via the second coupling mechanism, the second section may be detached or removed from the cover.

The second opening may extend along a portion of a lower edge of the third section to at least the second section. In some embodiments, the second opening may extend along the portion of the lower edge of the third section to the first section. In these embodiments, in response to the third section being uncoupled from the second section via the second coupling mechanism and the first section being uncoupled from the second section via the first coupling mechanism, the second section may be detached or removed from the cover.

In some embodiments, the third opening may be disposed between the first section and the lower portion. In some embodiments, the fourth opening may be disposed between the third section and the lower portion. In some embodiments, the first opening, the second opening, and/or the fourth opening may be configured to receive a seat belt. In some embodiments, the first opening, the second opening, the third opening and/or the fourth opening may be configured to receive a fastener used to anchor a child car seat.

In some embodiments, the lower portion may include a slit, which may extend linearly inward from a lower edge of the lower portion. The slit may allow a section of the lower portion to be folded over to expose a portion of a floor of the cargo bay. In some embodiments, the slit may extend linearly inward from a center of the lower edge of the lower portion.

In some embodiments, one or more of the following may extend along substantially all of a height of the upper portion: the first vertical slit, the second vertical slit, the first coupling mechanism, and the second coupling mechanism. In some embodiments, the first coupling mechanism may extend along at least a portion of the first vertical slit and/or the second coupling mechanism may extend along at least a portion of the second vertical slit. The first and second coupling mechanisms may each include any suitable coupling mechanism, such as for example, one or more zippers, buttons, snaps, magnets, clasps, eyelets, hooks, VELCRO™, etc.

In some embodiments, the cover may be constructed of a fabric material, such as, for example, one or more of the following: spandex knit, lycra knit, jersey knit, interlock knit, ribbed knit, terry knit, sweater knit, modal knit, hemp knit, bamboo knit, silk knit, cotton knit, ponte de roma, thermal knit, stretch lace, synthetic knit, organic knit, polyvinyl chloride, cotton, nylon, polyester, etc. In some embodiments, the fabric material may be stretchable. In some embodiments, the fabric material may allow the cover to be pliable so the cover may be folded and/or conform to a shape and dimension of the vehicle. In some embodiments, the fabric material may be weather-proof and/or machine-washable. In some embodiments, the cover may include a first layer of the fabric material and a second layer of the fabric material, which may be sewn together. In some embodiments, padding may be disposed between at least a portion of the first and second layers of the fabric material.

In some embodiments, the cover may include another layer or backing layer, which may be disposed on at least a portion of an underside of the cover. For example, when the cover is used as the cargo bed cover, the backing layer may be disposed on an underside of the upper and lower portions. As another example, when the cover is used as the seat cover, the backing layer may be disposed on an underside of the lower section. In some embodiments, the backing layer may be configured to prevent slippage and/or increase friction between the cover and the seat and/or the cargo bed. In some embodiments, the backing layer may include a netting. In some embodiments, the backing layer may be constructed of rubber, plastic, or another suitable material that allows the cover to be flexible and/or foldable. In some embodiments, the cover may include a water-proof coating.

In some embodiments, the cover may include a guard portion, which may be coupled to a lower edge of the lower portion. In some embodiments, the guard portion may include a pliable skirt. In some embodiments, when the cover is used as the cargo bed cover, the guard may be configured to extend over a bumper of the vehicle. In some embodiments, when the cover is used as the seat cover, the guard may be configured to extend vertically and/or generally perpendicularly from the lower portion. The guard portion may or may not include the padding.

In some embodiments, a cargo bed cover system may include a head liner cover and/or the cover. In some embodiments, the head liner cover may include one or more fasteners coupled to an interior of the vehicle. In some embodiments, the head liner cover may be disposed above the cargo bed of the vehicle. The interior of the vehicle may include a ceiling and/or a door of the vehicle. In some embodiments, the head liner cover may include an elongated fabric material, which may have a length approximately equal to a width of the vehicle. In some embodiments, the one or more fasteners may be configured to secure the fabric material at least proximate the ceiling. For example, the fabric material may be spaced apart and/or touch the ceiling. The one or more fasteners may each include a hook, a button, a zipper, a snap, a magnet, a clasp, an eyelet, a hook, VELCRO™, or another suitable fastener.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION OF THE INVENTION

The presently preferred embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Figure 1:
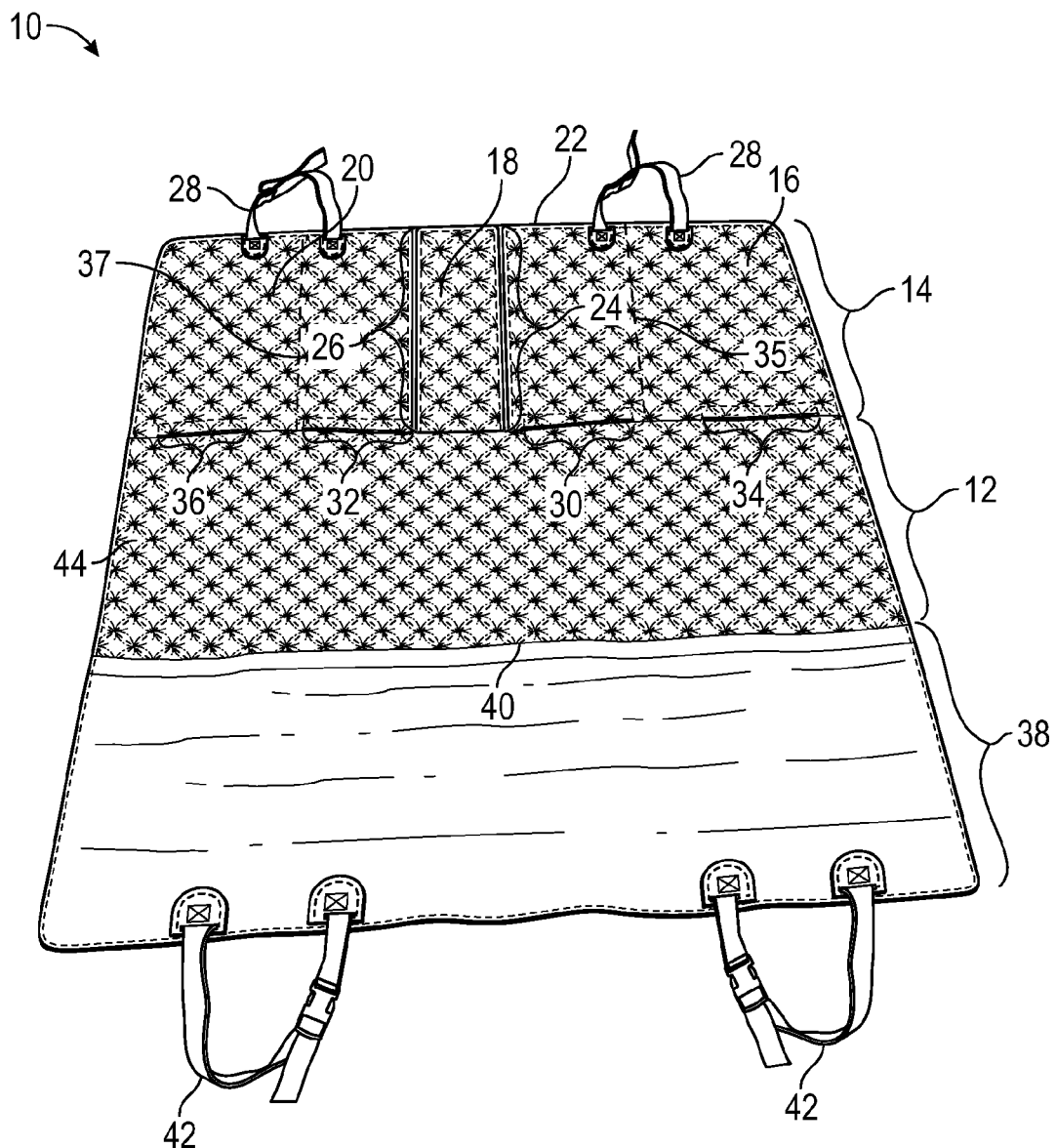
FIG. 1 is a top view of an example cover, according to some embodiments.

Referring now to FIG. 1, in some embodiments, the cover 10 for the vehicle may include a seat cover and/or a cargo bed cover. In some embodiments, the cover 10 may include a lower portion 12. In some embodiments, the cover 10 may also include an upper portion 14 coupled to the lower portion 12.

In some embodiments, the upper portion 14 may include one or more of the following: a first section 16, a second section 18, and a third section 20. In some embodiments, the first section 16, the second section 18, and the third section 20 may extend from an upper edge 22 of the upper portion 14 to the lower portion 12. In some embodiments, the first and second sections 16, 18 may be separated by a first vertical slit 24. In some embodiments, the second and third sections 18, 20 may be separated by a second vertical slit 26.

In some embodiments, the cover 10 may include a first coupling mechanism, which may be configured to directly couple the first section 16 and the second section 18. In some embodiments, the first coupling mechanism may be configured to at least partially close the first vertical slit 24, which may extend from the upper edge 22 to the lower portion 12. In some embodiments, the cover 10 may include a second coupling mechanism, which may be configured to directly couple the second section 18 and the third section 20. In some embodiments, the second coupling mechanism may be configured to at least partially close the second vertical slit 26.

In some embodiments, one or more of the following may include one or more fasteners 28 configured to secure the cover 10 to the seat: an upper portion of the first section 16, an upper portion of the second section 18, and an upper portion of the third section 20. In some embodiments, the fasteners 28 may be configured to secure the cover 10 to one or more headrests of the vehicle. In some embodiments, the upper portion of the first section 16 and the upper portion of the third section 20 may include a fastener 28. Each of the fasteners 28 may include any suitable means of securing the cover 10 to the seat. For example, as illustrated in FIG. 1, each of the fasteners 28 may include a belt, which may be configured to form a loop around the headrest. In some embodiments, the loop may include a clasp.

In some embodiments, the cover 10 may include one or more openings disposed between the upper portion 14 and the lower portion 12. In some embodiments, the one or more openings may include one or more of the following: a first opening 30, a second opening 32, a third opening 34, and a fourth opening 36. In some embodiments, one or more of the first opening 30, the second opening 32, the third opening 34, and the fourth opening 36 may include a generally horizontal slit. In some embodiments, the first opening 30 may extend along a portion of a lower edge of the first section 16 to at least the second section 18. In some embodiments, the first opening 30 may extend along the portion of the lower edge of the first section to the third section 20. In these embodiments, in response to the first section 16 being uncoupled from the second section 18 via the first coupling mechanism and the third section 20 being uncoupled from the second section 18 via the second coupling mechanism, the second section 18 may be detached or removed from the cover 10.

In some embodiments, the second opening 32 may extend along a portion of a lower edge of the third section 20 to at least the second section 18. In some embodiments, the second opening 32 may extend along the portion of the lower edge of the third section 20 to the first section 16. In these embodiments, in response to the third section 20 being uncoupled from the second section 18 via the second coupling mechanism and the first section 16 being uncoupled from the second section 18 via the first coupling mechanism, the second section 18 may be detached or removed from the cover 10. In some embodiments, the first section 16 may be folded over fold line 35 and/or the third section 20 may be folded over fold line 37.

In some embodiments, the third opening 34 may be disposed between the first section 16 and the lower portion 12. In some embodiments, the fourth opening 36 may be disposed between the third section 20 and the lower portion 12. In some embodiments, the first opening 34 and/or the fourth opening 36 may be configured to receive a seat belt and/or a fastener used to anchor a child car seat.

In some embodiments, the cover 10 may be constructed of a fabric material, such as, for example, one or more of the following: spandex knit, lycra knit, jersey knit, interlock knit, ribbed knit, terry knit, sweater knit, modal knit, hemp knit, bamboo knit, silk knit, cotton knit, ponte de roma, thermal knit, stretch lace, synthetic knit, organic knit, polyvinyl chloride, cotton, nylon, polyester, etc. In some embodiments, the fabric material may be stretchable. In some embodiments, the fabric material may be weather-proof and/or machine-washable. In some embodiments, the cover 10 may include a guard portion 38, which may be coupled to a lower edge 40 of the lower portion 12. In some embodiments, when the cover 10 is used as the cargo bed cover, the guard portion 38 may be configured to extend over a bumper of the vehicle. In some embodiments, when the cover 10 is used as the seat cover, the guard portion 38 may be configured to extend vertically and/or generally perpendicularly from the lower portion 12. In some embodiments, the guard portion 38 may include one or more fasteners 42, which may be configured to secure the cover 10 to the seat of the vehicle. Each of the fasteners 42 may include any suitable means of securing the cover 10 to the seat. For example, as illustrated in FIG. 1, each of the fasteners 42 may include a belt, which may be configured to form a loop around a portion of the seat, such as a leg. In some embodiments, the loop may include a clasp.

In some embodiments, the cover may be configured to hang similar to a hammock between one or more headrests disposed on front seats of the vehicle and one or more headrests disposed on back seats of the vehicle. For example, each of the fasteners 28 may be coupled with the head rests disposed on the front seats of the vehicle and each of the fasteners 42 may be coupled with the head rests disposed on the back seats of the vehicle. In these embodiments, the lower portion 12 may hang lower than then upper portion 14 and/or the guard portion 38.

Figure 2:
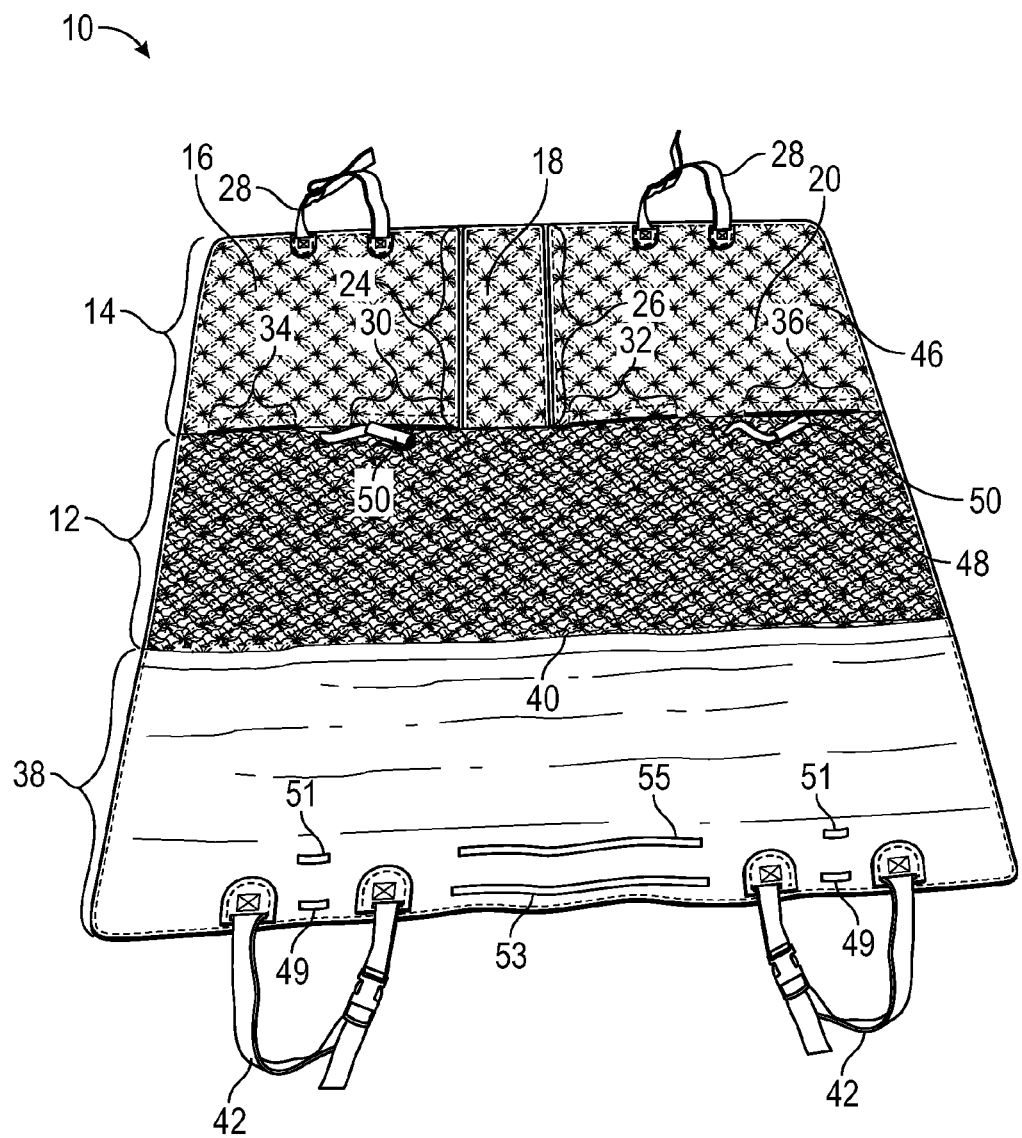
FIG. 2 is a bottom view of the example cover of FIG. 1, according to some embodiments.

Referring now to FIGS. 1 and 2, in some embodiments, the cover 10 may include a first layer 44 of the fabric material and a second layer 46 of the fabric material, which may be sewn together. In some embodiments, padding may be disposed between at least a portion of the first and second layers 38, 40 of the fabric material. In some embodiments, the guard portion 38 may or may not include the padding. In some embodiments, the guard portion 38 may include a single layer of the fabric material.

Referring now to FIG. 2, in some embodiments, the cover 10 may include another layer or backing layer 48, which may be disposed on at least a portion of an underside of the cover 10. For example, the backing layer 48 may be disposed on an underside of the lower portion 12 and/or the upper portion 14. In some embodiments, when the cover 10 is used as the cargo bed cover, the backing layer 48 may be disposed on an underside of the lower and upper portions 12, 14. In some embodiments, when the cover 10 is used as the seat cover, the backing layer 48 may be disposed on an underside of the lower portion 12. In some embodiments, the backing layer 48 may be configured to prevent slippage and/or increase friction between the cover 10 and the seat and/or the cargo bed. In some embodiments, the backing layer 48 may include a netting. In some embodiments, the backing layer 48 may be constructed of rubber, plastic, or another suitable material that allows the cover 10 to be flexible and/or foldable. In some embodiments, the cover 10 may include a water-proof coating. In some embodiments, one or more anchors 50 may be coupled to the underside of the cover 10. In some embodiments, the anchors 50 may be configured to be tucked into a crease in the seat between the backrest and the bench of the seat. In some embodiments, the anchors 50 may be looped-shaped.

In some embodiments, one or more of the following may extend along substantially all of a height of the upper portion 14: the first vertical slit 24, the second vertical slit 26, the first coupling mechanism, and the second coupling mechanism.

In some embodiments, the guard portion 38 may include one or more guard coupling mechanisms, which may allow all or a portion of the guard portion 38 to be securely rolled or folded. In some embodiments, the one or more guard coupling mechanisms may be disposed on a bottom or underside of the guard portion 38. In some embodiments, each of the fasteners 42 may be folded such that a middle portion of the fastener 42 is disposed between a first guard coupling mechanism 49 and a second guard coupling mechanism 51. In some embodiments, the first and second guard coupling mechanisms 49, 51 may then be coupled together and the guard portion 38 folded such that the fastener 42 is secured within the guard portion 38.

Additionally or alternatively, in some embodiments, a third guard coupling mechanism 53 may extend along all or a portion of an edge of the guard portion 38. In some embodiments, the third guard coupling mechanism 53 may be coupled with a corresponding fourth guard mechanism 55. In some embodiments, the third guard coupling mechanism 53 and/or the corresponding fourth guard coupling mechanism 55 may prevent the guard portion 38 from sagging when the guard portion 38 is rolled or folded.

In some embodiments, a particular guard coupling mechanism 53 may be configured to couple with a particular fastener 42. For example, the particular guard coupling mechanism 53 may be a loop and the particular fastener 42 may be secured within the loop. In these and other embodiments, a single guard coupling mechanism may secure the particular fastener 42.

The guard coupling mechanisms illustrated in FIG. 2B are VELCRO™ However, the guard coupling mechanisms 49, 51, 53, 55 may each include any suitable coupling mechanism, such as for example, one or more buttons, snaps, magnets, clasps, eyelets, hooks, VELCRO™, etc. The guard coupling mechanisms may be disposed at any number of locations on the underside of the guard portion 38 to allow the guard portion to be rolled or folded.

Figure 3:
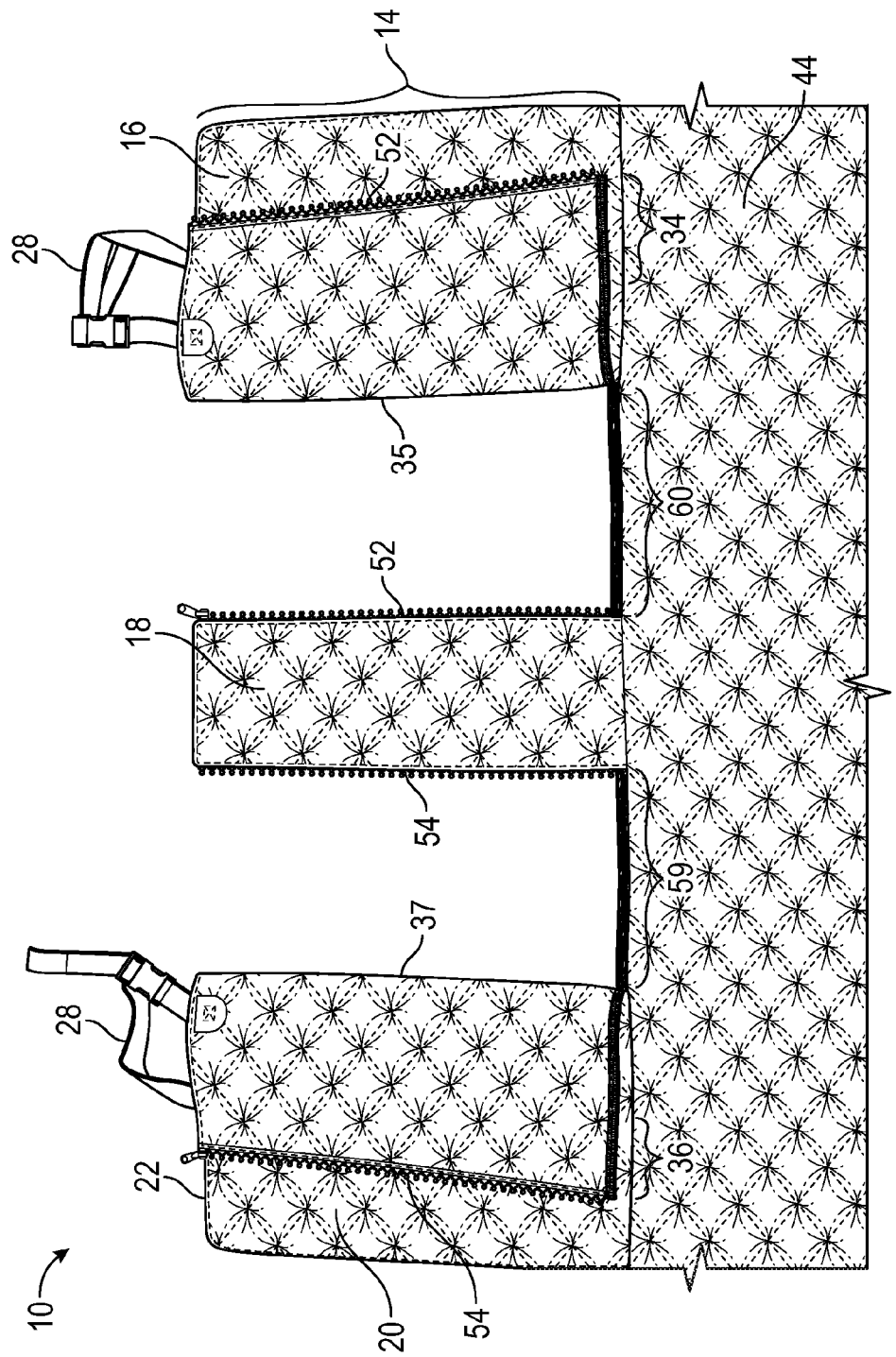
FIG. 3 is a top view of a portion of the example cover of FIG. 1, illustrating a first section and a third section of an upper portion of the cover uncoupled from a second portion of the upper portion via the first and second coupling mechanisms.

Referring now to FIG. 3, in some embodiments, the first coupling mechanism 52 may extend along at least a portion of the first vertical slit 24 and/or the second coupling mechanism 54 may extend along at least a portion of the second vertical slit 26. The first and second coupling mechanisms 52, 54 may each include any suitable coupling mechanism, such as for example, one or more buttons, snaps, magnets, clasps, eyelets, hooks, VELCRO™, etc. In some embodiments, the first and second coupling mechanisms 52, 54 may include zippers, as illustrated in FIG. 3.

In some embodiments, a third coupling mechanism 60 may be configured to at least partially close the first opening 30. In some embodiments, a fourth coupling mechanism 59 may be configured to at least partially close the second opening 32. In some embodiments, the third coupling mechanism 60 may extend along at least a portion of the first opening 30. In some embodiments, the fourth coupling mechanism 59 may extend along at least a portion of the second opening 32. In some embodiments, the third coupling mechanism 60 and/or the fourth coupling mechanism 59 may each include any suitable coupling mechanism, such as for example, one or more buttons, snaps, magnets, clasps, etc. In some embodiments, the third coupling mechanism 60 and/or the fourth coupling mechanism may be disposed in a crease or seam between the lower portion 12 and the upper portion 14.

In some embodiments, the third coupling mechanism 60 and/or the fourth coupling mechanism 59 may include VELCRO™, as illustrated in FIG. 3, which may allow the first opening 30 and/or the second opening 32 to partially open to access a seatbelt. Coupling mechanisms the same as or similar to the first coupling mechanism 52, the second coupling mechanism 54, the third coupling mechanism 60, or the fourth coupling mechanism 59, may be used to close or partially close the third opening 34 and/or the fourth opening 36. In some embodiments, one or more of the following may be eliminated: the first coupling mechanism 52, the second coupling mechanism 54, the third coupling mechanism 60, and the fourth coupling mechanism 59. In some embodiments, the cover 10 may not include one or more of the following: the first coupling mechanism 52, the second coupling mechanism 54, the third coupling mechanism 59, and the fourth coupling mechanism 60.

Figure 4:
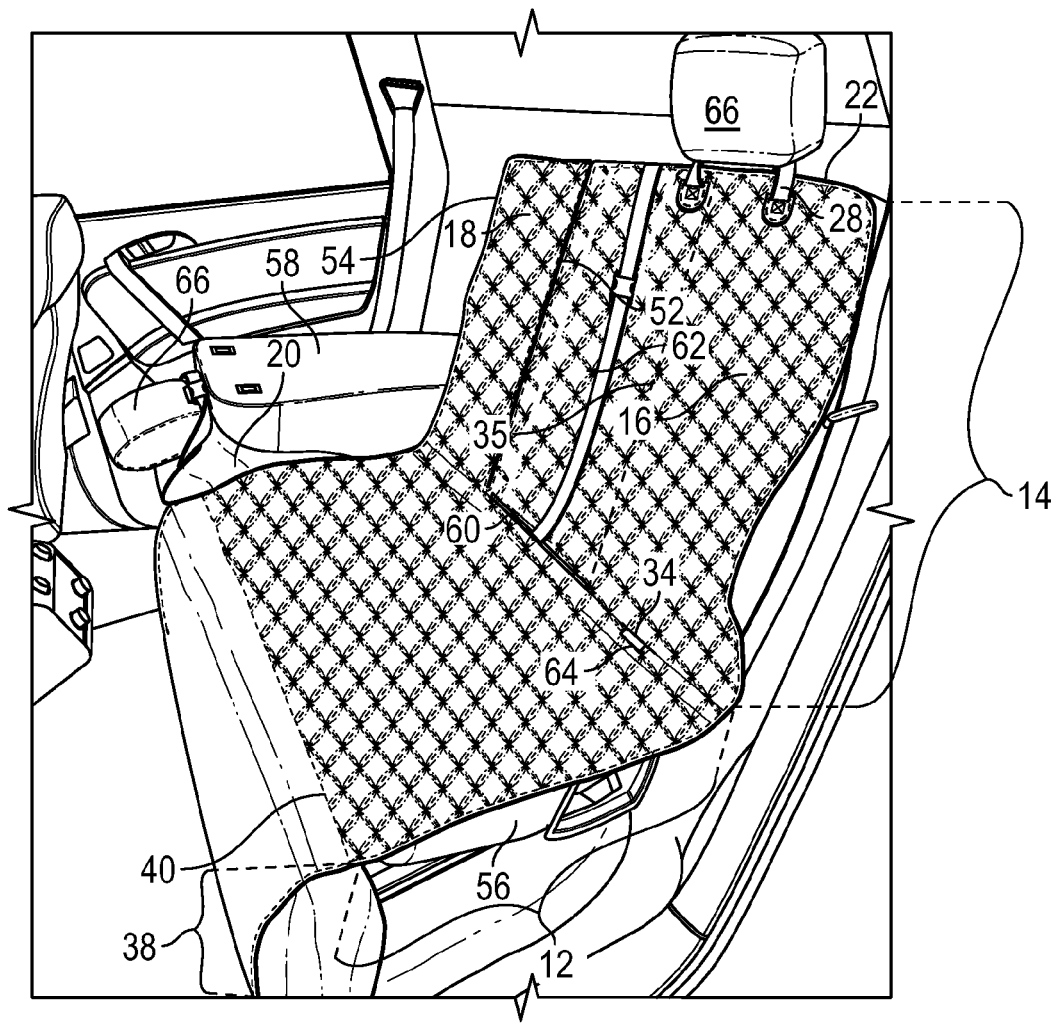
FIG. 4 is an upper perspective view of the cover of FIG. 1, illustrating the cover extending over a bench and backrest of a vehicle seat in one configuration, according to some embodiments.
Figure 5:
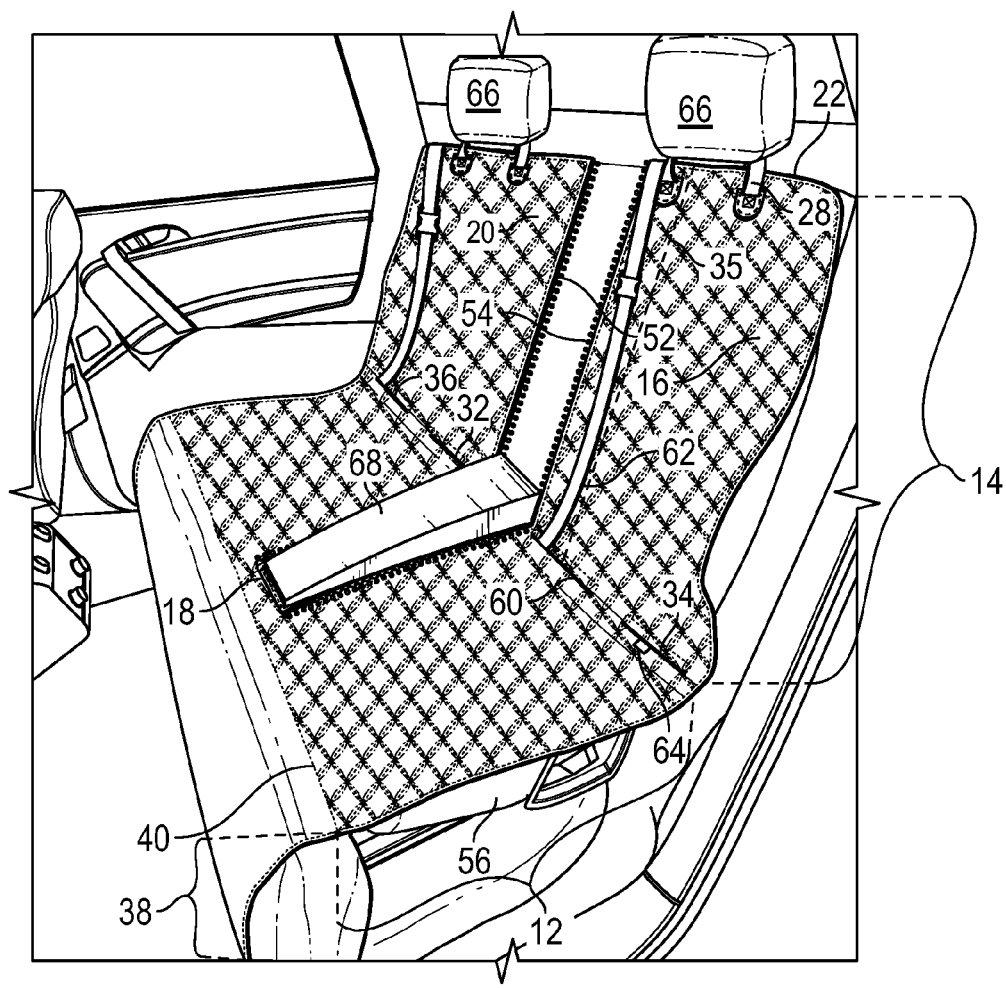
FIG. 5 is an upper perspective view of the cover of FIG. 1, illustrating the cover extending over the bench and the backrest of the vehicle seat in another configuration, according to some embodiments.
Figure 6:
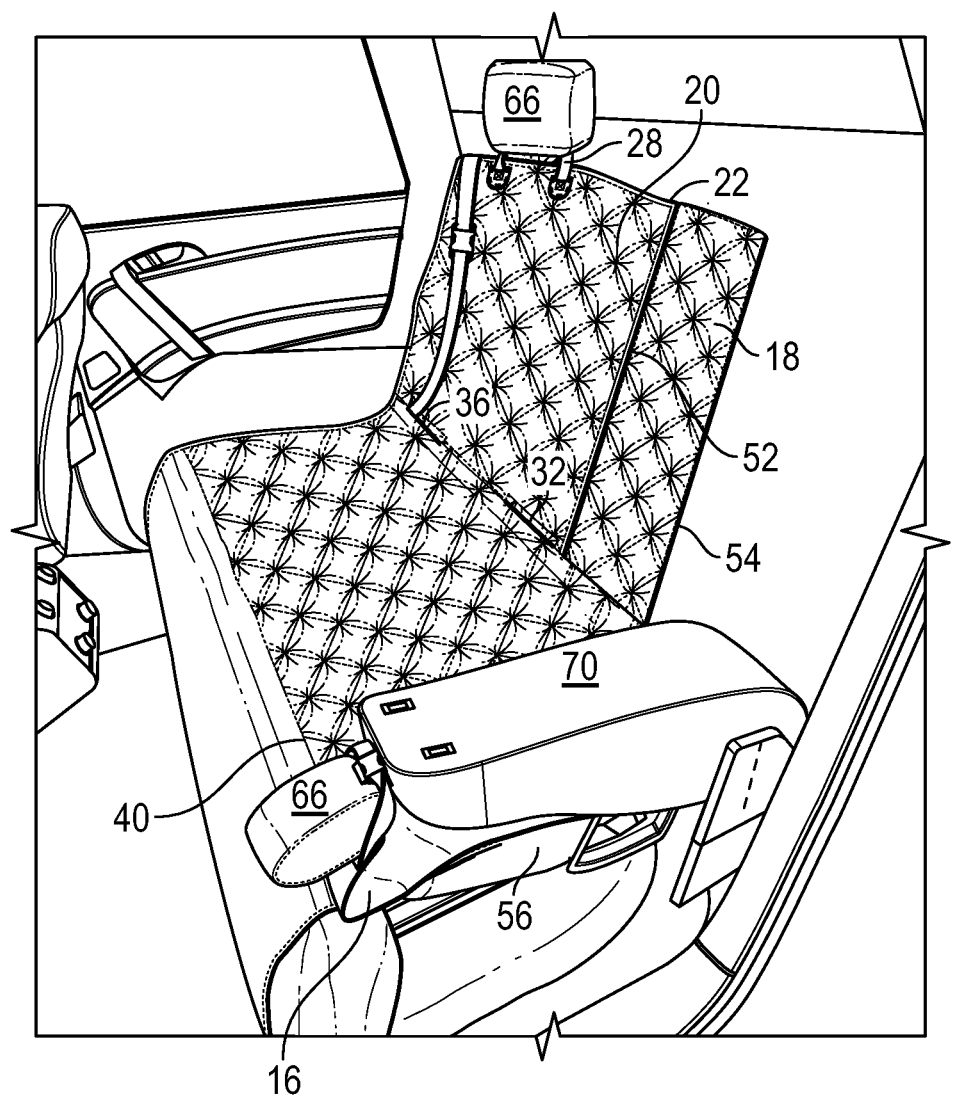
FIG. 6 is an upper perspective view of the cover of FIG. 1, illustrating the cover extending over the bench and the backrest of the vehicle seat in another configuration, according to some embodiments.

Referring now to FIGS. 4-6, in some embodiments, the lower portion 12 may be sized and configured to extend over a horizontally-oriented top of a bench 56 of a vehicle seat. In some embodiments, a third section 58 of the backrest may be configured to be folded on top of the lower portion 12 independently of the first and second sections 16, 18 in response to the third section 20 being uncoupled from the second section 18 via the second coupling mechanism 54. In some embodiments, when the cover 10 is used as the seat cover, the third section 20 may be configured to be folded on top of the lower portion 12 independently of the first and second sections 16, 18 in response to the third section 20 being uncoupled from the second section 18 via the second coupling mechanism 54 and/or the third portion 58 of the backrest being moved to a folded position.

In some embodiments, the third coupling mechanism 60 may be configured to at least partially close the first opening 30. In some embodiments, as illustrated in FIG. 4, the third coupling mechanism 60 may be configured to partially close the first opening 30 such that a seat belt 62 may extend through the first opening 30. In some embodiments, the fourth coupling mechanism 59 may configured the same as or similar to the third coupling mechanism 60.

In some embodiments, a fastener 64 may be configured to, for example, anchor a child car seat and may extend through the third opening 34 and/or the fourth opening 36. In some embodiments, each of the fasteners 28 may be configured to secure the cover 10 to a headrest 66 of the vehicle.

As illustrated in FIG. 5, in some embodiments, the second section 18 may be configured to be folded on top of the lower portion 12 independently of the first and third sections 16, 20 in response to the first section 16 being uncoupled from the second section 18 via the first coupling mechanism 52 and the third section 20 being uncoupled from the second section 18 via the second coupling mechanism 54. In some embodiments, when the cover 10 is used as the seat cover, the second section 18 may be configured to be folded on top of the lower portion 12 independently of the first and third sections 16, 20 in response to the first section 16 being uncoupled from the second section 18 via the first coupling mechanism 52 and the third section 54 being uncoupled from the second section 18 via the second coupling mechanism 54, and further in response to a second portion 68 of the back rest being moved to a folded position, as illustrated in FIG. 5. In some embodiments, the second portion 68 of may correspond to an arm rest or a person location.

As illustrated in FIG. 6, in some embodiments, the first section 16 may be configured to be folded on top of the lower portion 12 independently of the second and third sections 18, 20 in response to the first section 16 being uncoupled from the second section 18 via the first coupling mechanism 52. In some embodiments, when the cover 10 is used as the seat cover, the first section 16 may be configured to be folded on top of the lower portion 12 independently of the second and third sections 18, 20 in response to the first section 16 being uncoupled from the second section 18 via the first coupling mechanism 52 and/or a first section 70 of the backrest being moved to a folded position.

Figure 7:
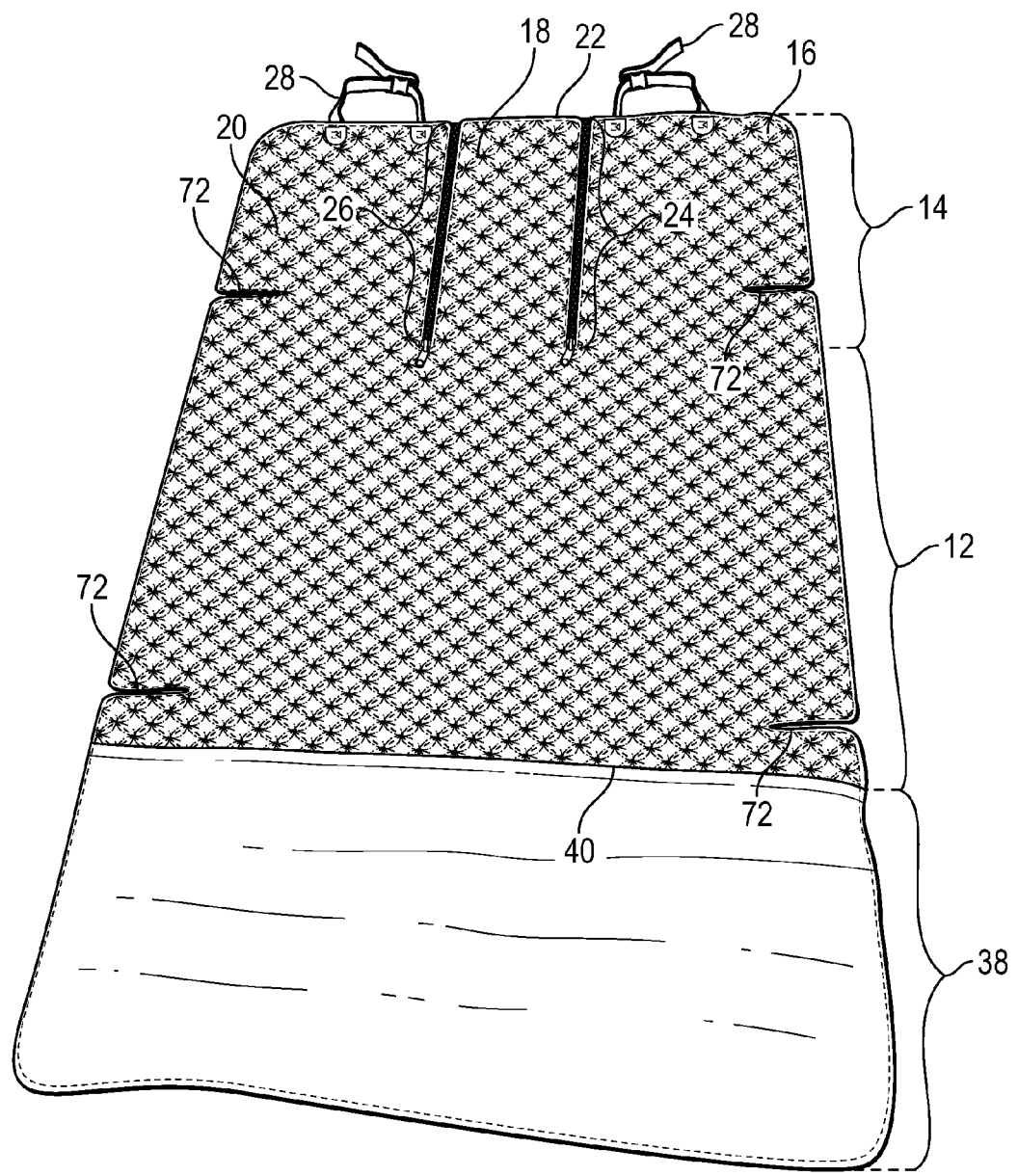
FIG. 7 is a top view of another example cover, according to some embodiments.

Referring now to FIG. 7, in some embodiments, a cover 72 may include the cargo bed cover. In some embodiments, the cover 72 may include or correspond to the cover 10 described in the previous figures. In some embodiments, one or more of the first opening 30, the second opening 32, the third opening 34, and the fourth opening 36 may be absent when the cover 72 includes the cargo bed cover, as illustrated in FIG. 7. In some embodiments, edges of the lower and upper portions 12, 14 may include slits 74 configured to facilitate folding of the cover 10 to cover portions of a side wall of the interior of the vehicle proximate the cargo bed. In some embodiments, the edges of the cover 72 may include any number of slits 74, which may be positioned at various locations. In some embodiments, the slits 74 may be configured to allow one or more wings 75 to be folded upward. In some embodiments, the wings 75 may allow the cover 72 to be fitted to various cargo areas and vehicles. Thus, the wings 75 may facilitate universal usage of the cover 72. For example, a particular cargo area may include a protrusion, such as a tire well, and the wings 75 may be configured to allow the cover 72 to bend around the protrusion. In some embodiments, the cover 72 may include four slits 74, as illustrated in FIG. 7. In some embodiments, the cover 72 may have less than or more than four slits 74. In some embodiments, one or more coupling mechanisms may at least partially close one or more of the slits 74, which may increase a length of a particular wing 75.

Figure 8:
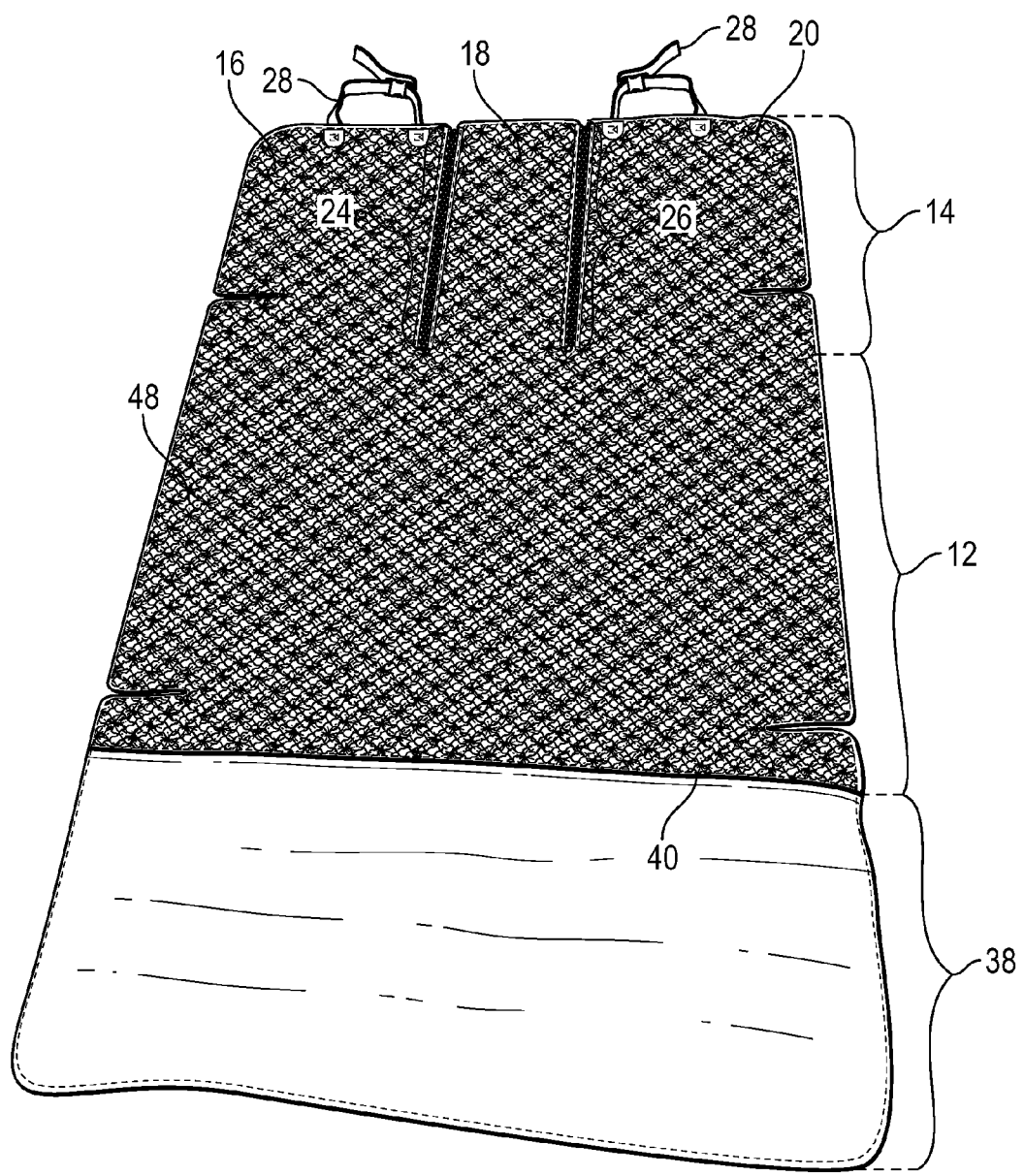
FIG. 8 is a bottom view of the example cover of FIG. 4, according to some embodiments.

Referring now to FIG. 8, in some embodiments, when the cover 72 is used as the cargo bed cover, the backing layer 48 may be disposed on an underside of the lower and upper portions 12, 14.

Figure 9:
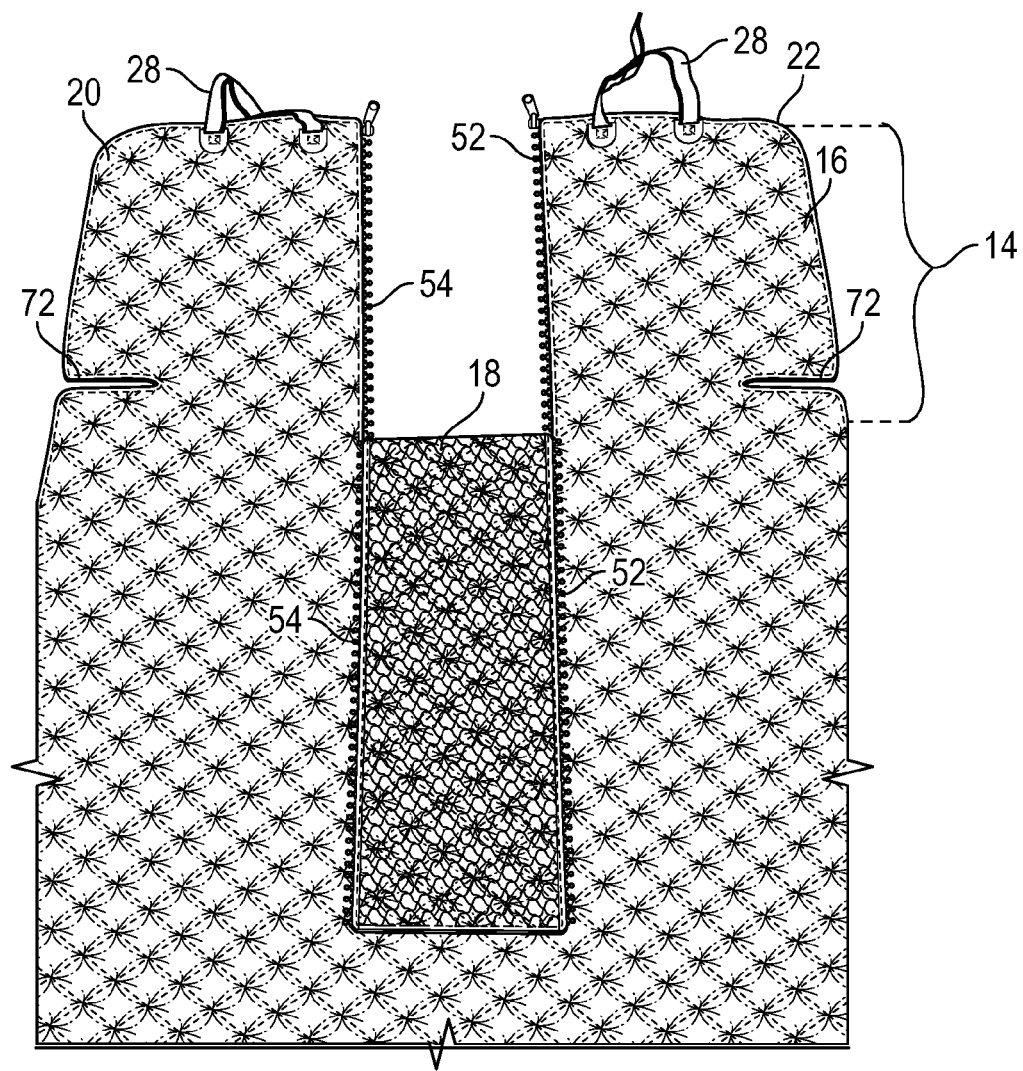
FIG. 9 is top view of a portion of the example cover of FIG. 4, illustrating a first section and a third section of an upper portion of the cover uncoupled from a second portion of the upper portion via the first and second coupling mechanisms, according to some embodiments.
Figure 10:
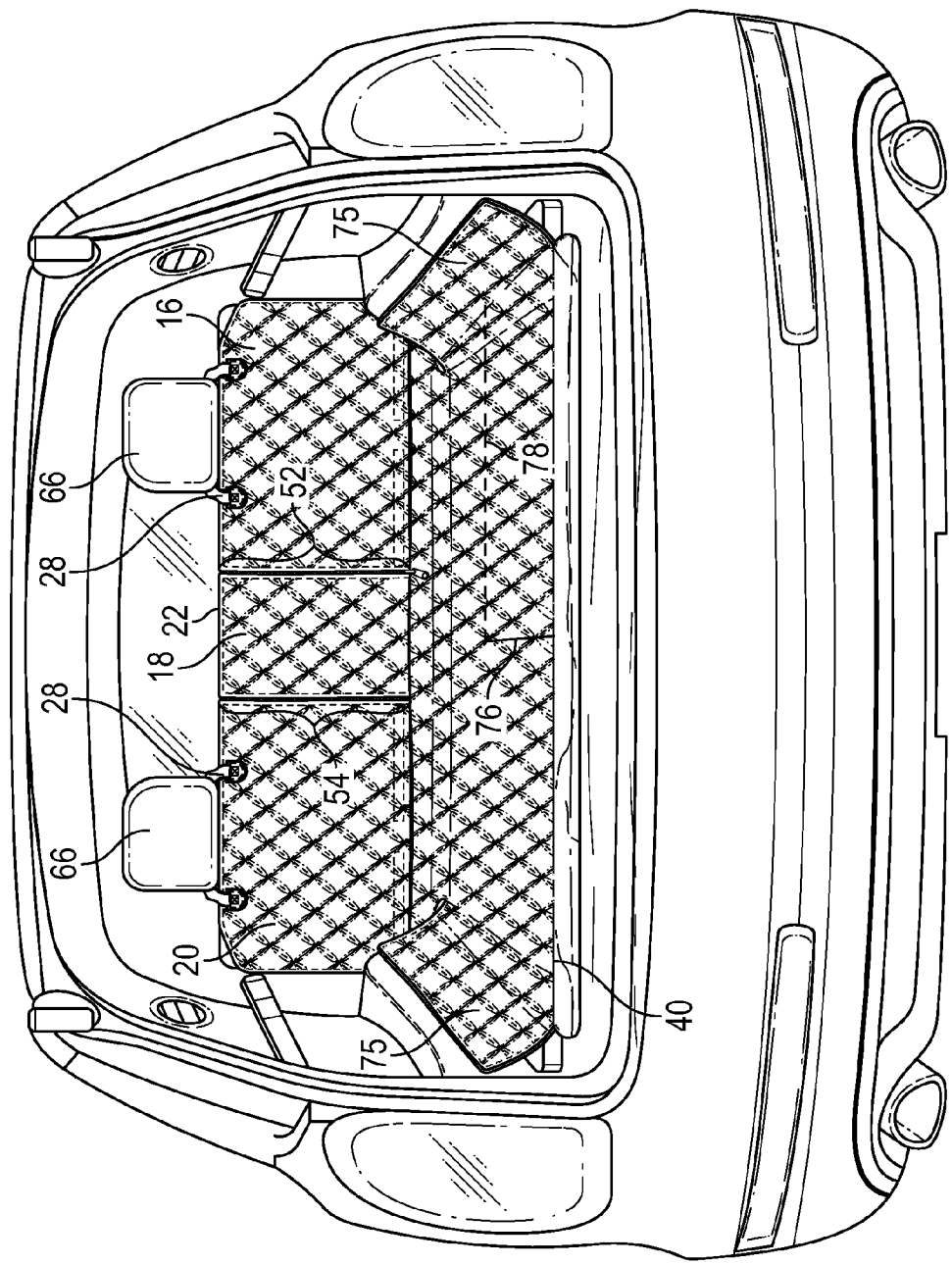
FIG. 10 is an upper perspective view of the cover of FIG. 4, illustrating the cover extending over a rear surface of a backrest of a vehicle seat and a cargo area in one configuration, according to some embodiments.

Referring now to FIG. 9, any or all of the first section 16, the second section 18, and the third section 20 may be configured to fold along an edge between the upper portion 14 and the lower portion 12. FIG. 9 illustrates the second section 18 independently folded on top of the lower portion 12.

Referring now to FIGS. 10-13, in some embodiments, the lower portion 12 may be sized and configured to extend over a horizontally-oriented cargo area of the vehicle. In some embodiments, the upper portion 14 may be sized and configured to extend upwardly over a backrest of the vehicle seat. In some embodiments, the upper portion 14 may be sized and configured to extend upwardly over a rear surface of the backrest.

In some embodiments, the lower portion 12 may include a slit 76, which may extend linearly inward from the lower edge 40 of the lower portion 12. The slit 76 may allow a section of the lower portion 12 to be folded over fold line 78 to expose a portion of a floor of the cargo bay. In some embodiments, the slit may extend linearly inward from a center of the lower edge of the lower portion.

Figure 11:
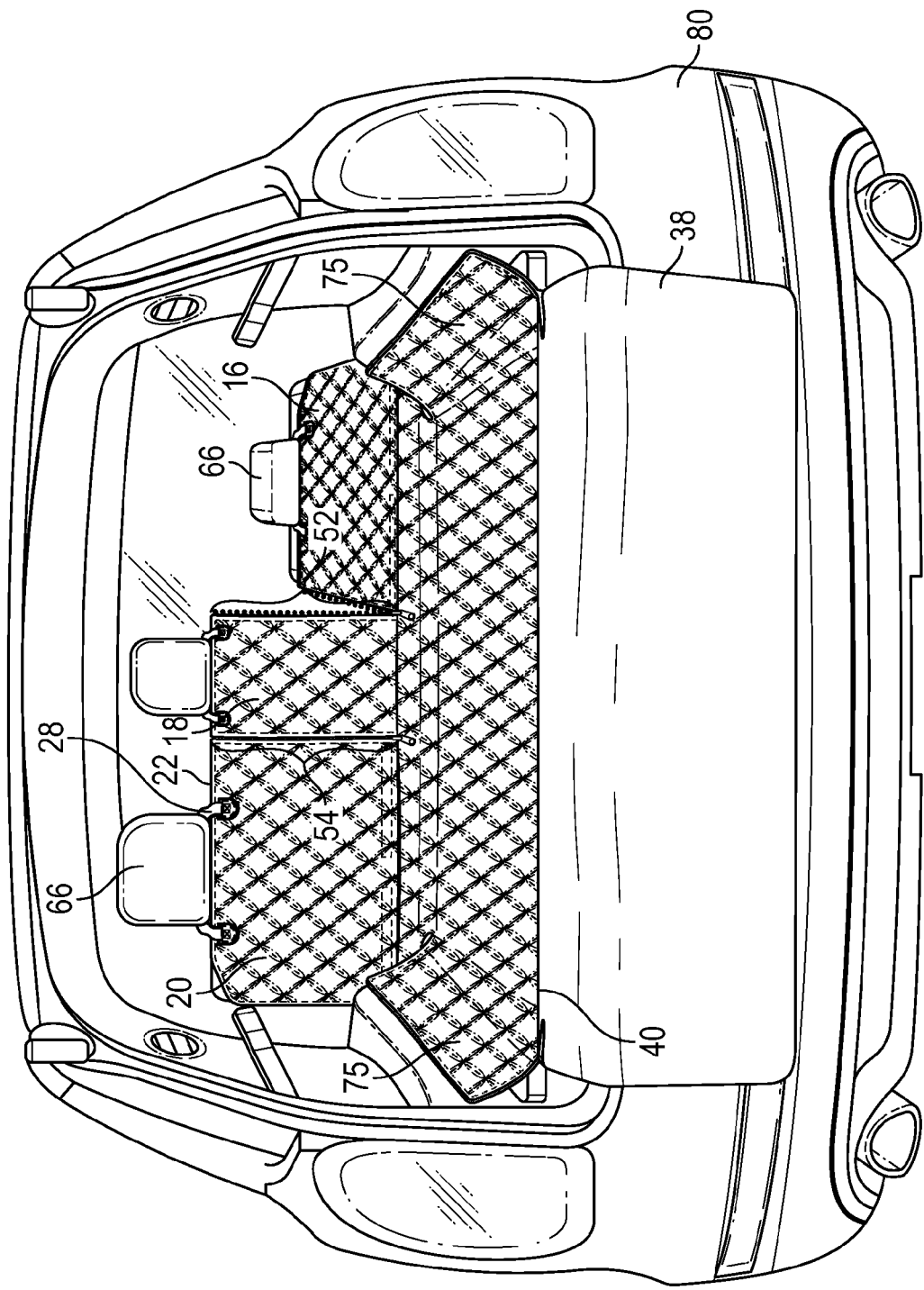
FIG. 11 is an upper perspective view of the cover of FIG. 4, illustrating the cover extending over the rear surface of the backrest and the cargo area in another configuration.

Referring now to FIG. 11, in some embodiments, the first section 16 may be configured to move to a generally horizontal position independently of the second and third sections 18, 20 in response to the first section 16 being uncoupled from the second section 18 via the first coupling mechanism 52 and/or the third section 58 of the backrest being moved to a folded position, as illustrated in FIG. 11. In some embodiments, when the cover 72 is used as the cargo bed cover, the guard portion 38 may be configured to extend over a bumper 74 of the vehicle.

Figure 12:
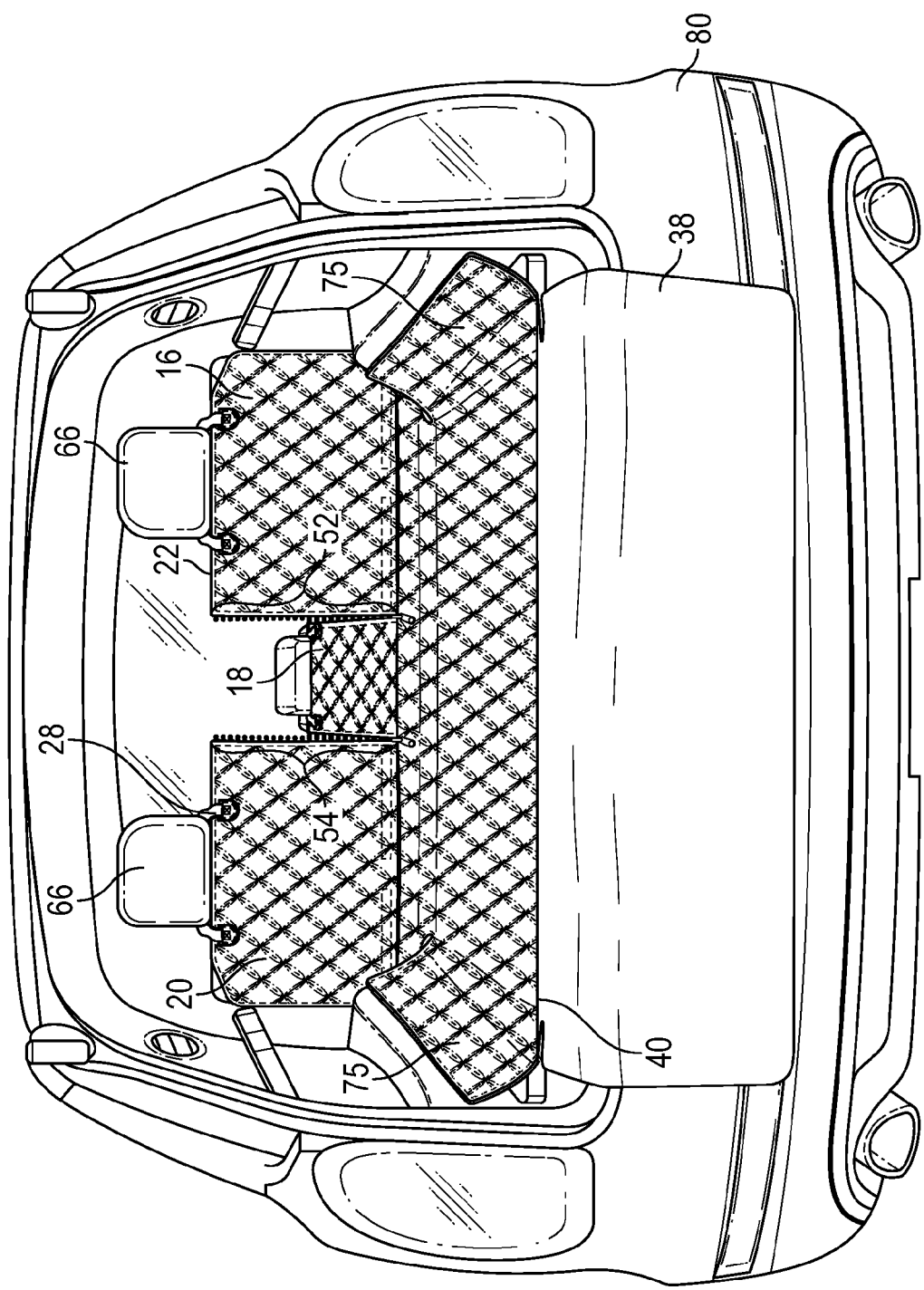
FIG. 12 is an upper perspective view of the cover of FIG. 4, illustrating the cover extending over the rear surface of the backrest and the cargo area in another configuration, according to some embodiments, according to some embodiments.

Referring now to FIG. 12, in some embodiments, the second section 18 may be configured to move to a generally horizontal position independently of the first and third sections 16, 20 in response to the first section 16 being uncoupled from the second section 18 via the first coupling mechanism 52 and the third section 20 being uncoupled from the second section 18 via the second coupling mechanism 54, and further in response to the second portion 68 of the back rest being moved to the folded position.

Figure 13:
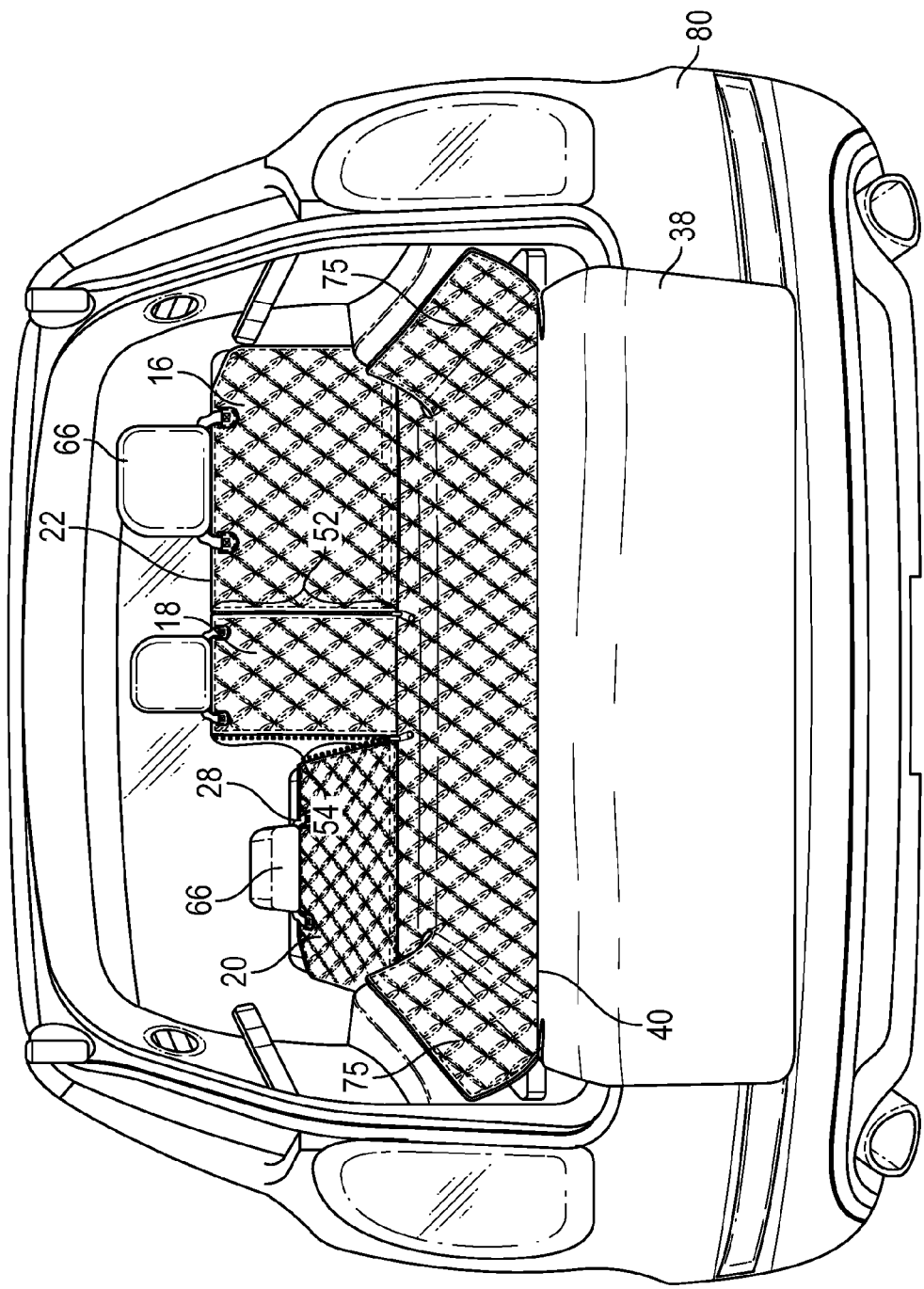
FIG. 13 is an upper perspective view of the cover of FIG. 4, illustrating the cover extending over the rear surface of the backrest and the cargo area in another configuration, according to some embodiments.

Referring now to FIG. 13, in some embodiments, the third section 20 may be configured to move to a generally horizontal position independently of the first and second sections 16, 18 in response to the third section 20 being uncoupled from the second section 18 via the second coupling mechanism 54 and/or the first section 70 of the back rest being moved to the folded position.

Figure 14:
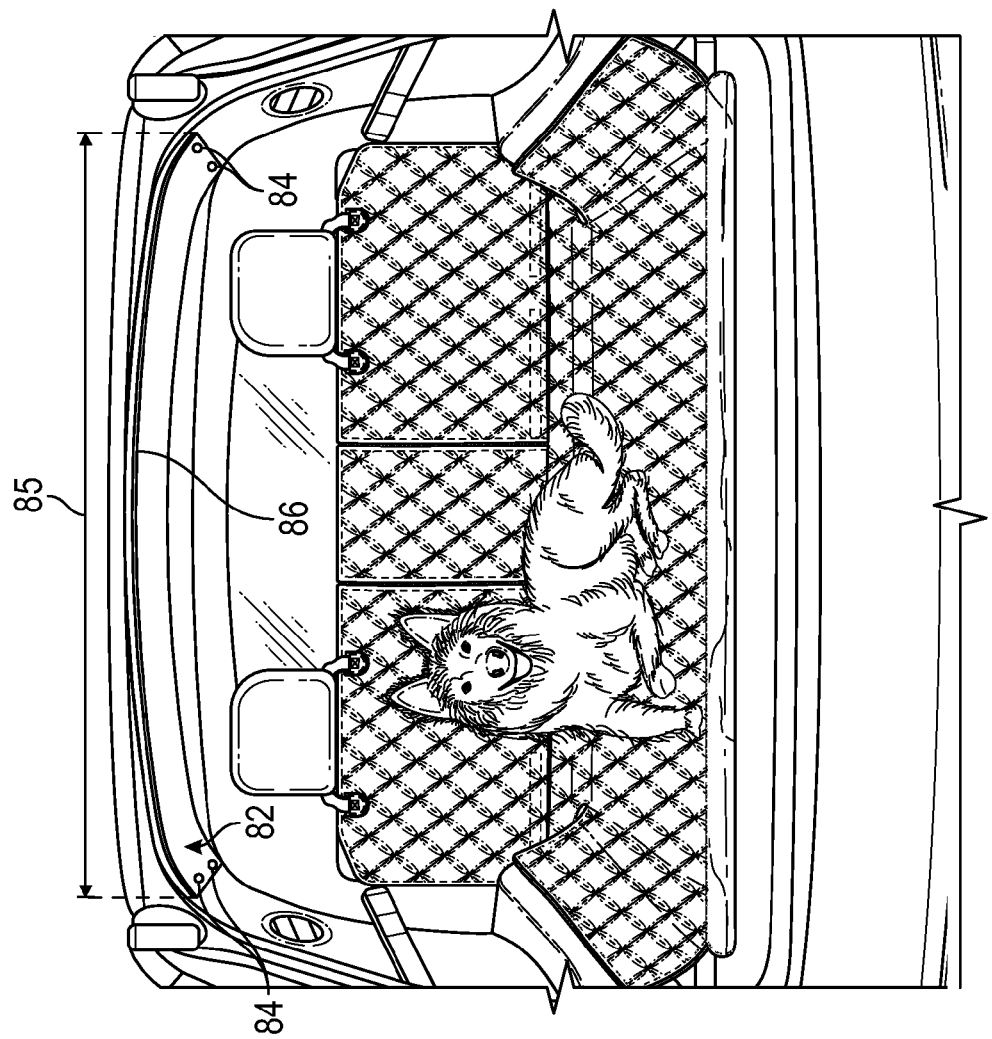
FIG. 14 is a lower perspective view of an example head liner cover, according to some embodiments.

Referring now to FIG. 14, in some embodiments, a cargo bed cover system may include a head liner cover 82 and/or the cover 70. In some embodiments, the head liner cover 82 may include one or more fasteners 84 coupled to an interior of the vehicle. In some embodiments, the head liner cover 82 may be disposed above the cargo bed of the vehicle. The head liner cover 82, however, may be disposed on any portion of the ceiling and/or one or more upper side walls of the vehicle. In some embodiments, the interior of the vehicle may include the ceiling and/or the upper side walls.

Figure 15:
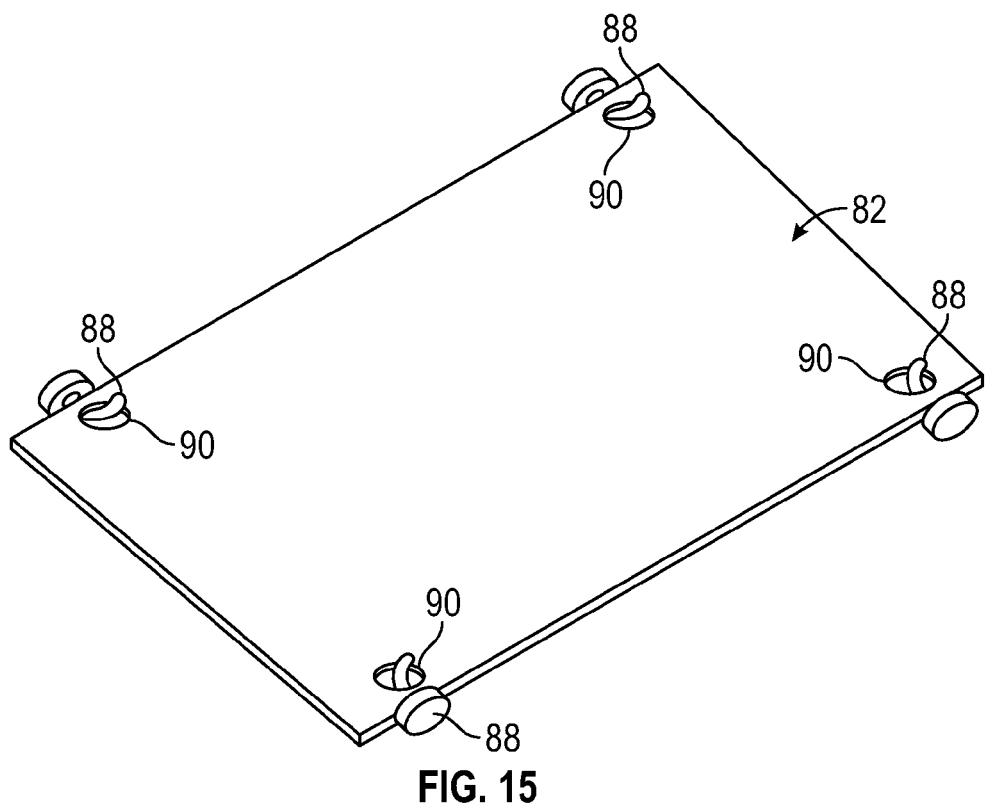
FIG. 15 is an upper perspective view of the example head liner cover of FIG. 14, illustrating one or more fasteners, according to some embodiments.

In some embodiments, the head liner cover 82 may include an elongated fabric material, which may have a length approximately equal to or slightly longer than a width 85 of the ceiling. In some embodiments, the one or more fasteners 84 may be configured to secure the fabric material at least proximate the ceiling. In some embodiments, the fabric material may be spaced apart and/or touch the ceiling. The one or more fasteners 84 may each include a hook, a button, a zipper, a snap, a magnet, a clasp, eyelets, hooks, VELCRO™, or another suitable fastener. In some embodiments, an adhesive may be used to secure the fabric material at least proximate the ceiling. The fasteners 84 may be coupled with any portion of the head liner cover 82. For example, referring now to FIG. 15, the fasteners 84 may be coupled with corners of the head liner cover 82, as illustrated in FIG. 15. In some embodiments, the fasteners may include hooks 88, which may be disposed in holes 90 of the head liner cover 82 to secure the fabric material at least proximate the ceiling. The head liner cover 82 may be permanently or removably coupled with the ceiling and/or upper side walls of the vehicle. In some embodiments, a rear edge 86 of the head liner cover 82 may be disposed at least proximate a top of a hatchback or trunk of the vehicle.

One of skill in the art will appreciate that the various features and elements of the various embodiments of the present invention may be modified and/or combined within the spirit of the present invention to provide a seat cover, cargo seat cover, and/or head liner cover. For example, the size, dimensions, shapes, proportions and materials of the present invention may be modified as desired or necessary based on, for example, a vehicle configuration, shape, or dimensions. For example, quantity and/or placement of one or more vertical slits, such as for example, the first vertical slit 24 and/or the second vertical slit 26, may be varied. As another example, quantity and/or placement of one or more openings, such as the first opening 30, the second opening 32, the third opening 34, and/or the fourth opening 36 may be varied. In some embodiments, the one or more openings may be disposed within the first section 16 and/or the second section 18. In some embodiments, a particular cover, such as, for example, the cover 10 and/or the cover 70, may be customized according to predetermined specifications to fit a particular vehicle interior. In some embodiments, a particular cover, such as, for example, the cover 10 and/or the cover 70, may be configured to fit various vehicle interiors and seat configurations, as described in the present specification.

The present invention may be embodied in other specific forms without departing from its structures, methods, or other essential characteristics as broadly described herein and claimed hereinafter. Therefore, the described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A seat cover for a vehicle, comprising:
   a lower portion sized and configured to extend over a horizontally-oriented top of a bench of a vehicle seat;
   an upper portion coupled to the lower portion, wherein the upper portion is sized and configured to extend upwardly over a backrest of the vehicle seat, wherein the upper portion has a first section, a second section, and a third section, wherein each of the first section, the second section, and the third section extend from an upper edge of the upper portion to the lower portion;
   a first coupling mechanism, wherein the first coupling mechanism is configured to couple the first section to the second section;
   a second coupling mechanism, wherein the second coupling mechanism is configured to couple the second section and the third section;
   a first opening interposed between the first section and the lower portion, wherein the first opening comprises a length that extends outwardly from the first coupling mechanism and along a portion of a lower edge of the first section;
   a third coupling mechanism disposed along the length of the first opening; and
   a second opening interposed between the first section and the lower portion and spaced apart from the first opening,
   wherein in response to uncoupling the first and third coupling mechanisms, a flapped portion of the first section is provided and configured to fold back on the first section.

2. The seat cover of claim 1, wherein the first section is configured to be folded on top of the lower portion independently of the second and third sections in response the first section being uncoupled from the second section via the first coupling mechanism.

3. The seat cover of claim 1, wherein the third section is configured to be folded on top of the lower portion independently of the first and second sections in response to the third section being uncoupled from the second section via the second coupling mechanism.

4. The seat cover of claim 1, wherein the second section is configured to be folded on top of the lower portion independently of the first and third sections in response to the first section being uncoupled from the second section via the first coupling mechanism and the third section being uncoupled from the second section via the second coupling mechanism.

5. The seat cover of claim 1, wherein an upper portion of the first section and an upper portion of the third section each include a belt configured to form a loop around a first head rest and a second head rest of the vehicle, respectively.

6. The seat cover of claim 1, wherein the third coupling mechanism includes VELCRO™, wherein the first and second coupling mechanisms each include a zipper.

7. The seat cover of claim 1, wherein one or more openings are disposed between the upper portion and the lower portion.

8. The seat cover of claim 1, wherein the first coupling mechanism and the second coupling mechanism extend along substantially all of a height of the upper portion.

9. The seat cover of claim 1, wherein the first coupling mechanism and the second coupling mechanism include VELCRO™.

10. A seat cover for a vehicle, comprising:
a lower portion sized and configured to extend over of a horizontally-oriented top of a bench of a vehicle seat;
an upper portion coupled to the lower portion, wherein the upper portion is sized and configured to extend upwardly over a backrest of the vehicle seat, wherein the upper portion has a first section, a second section, and a third section, wherein each of the first section, the second section, and the third section extend from an upper edge of the upper portion to the lower portion;
a first coupling mechanism configured to couple the first section to the second section along a vertical edge of the first section;
a second coupling mechanism configured to couple the second section and the third section along a vertical edge of the third section;
a first opening interposed between a horizontal edge of the first section and the lower portion, wherein the first opening comprises a length that extends outwardly from the first coupling mechanism and along the horizontal edge; and
a third coupling mechanism disposed along the length of the first opening,
wherein in response to uncoupling the first and third coupling mechanisms, a flapped portion of the first section is provided and configured to fold back on the first section.

11. The seat cover of claim 1, wherein the first section comprises a fastener configured to fasten the seat cover to a head rest, wherein the length of the first opening extends from the first coupling mechanism to a point on the portion of the lower edge of the first section that is approximately aligned with the fastener.

\* \* \* \* \*